(12) United States Patent
Reddy et al.

(10) Patent No.: US 9,342,566 B2
(45) Date of Patent: May 17, 2016

(54) SYSTEMS AND METHODS FOR SEARCHING DATA STRUCTURES OF A DATABASE

(71) Applicant: SAP SE, Walldorf (DE)

(72) Inventors: Vidyasagar Reddy, Walldorf (DE); Manasa Ranjan Tripathy, Walldorf (DE); Krishna Sasank Talasila, Walldorf (DE); Ganesh Vaitheeswaran, Walldorf (DE); Arindam Bhattacharjee, Walldorf (DE)

(73) Assignee: SAP SE, Walldorf (DE)

( * ) Notice: Subject to any disclaimer, the term of this patent is extended or adjusted under 35 U.S.C. 154(b) by 667 days.

(21) Appl. No.: 13/744,227

(22) Filed: Jan. 17, 2013

(65) Prior Publication Data

US 2014/0201194 A1    Jul. 17, 2014

(51) Int. Cl.
*G06F 17/30* (2006.01)

(52) U.S. Cl.
CPC .................... *G06F 17/30554* (2013.01)

(58) Field of Classification Search
None
See application file for complete search history.

(56) References Cited

U.S. PATENT DOCUMENTS

| | | | | |
|---|---|---|---|---|
| 7,181,450 B2* | 2/2007 | Malloy | ............ | G06F 17/30592 |
| 7,890,499 B1* | 2/2011 | Boswell | ............ | G06F 17/30864 |
| | | | | 707/722 |
| 8,612,451 B1* | 12/2013 | Wen | ................. | G06F 17/30572 |
| 2006/0149723 A1* | 7/2006 | Finger, II | ......... | G06F 17/30675 |
| | | | | 707/741 |
| 2007/0233663 A1* | 10/2007 | Ami | ................... | G06F 17/30241 |
| 2012/0215766 A1* | 8/2012 | Gorelik | ............ | G06F 17/30554 |
| | | | | 707/722 |
| 2012/0233241 A1* | 9/2012 | Dickens | ........... | G06F 17/30902 |
| | | | | 709/203 |
| 2013/0166573 A1* | 6/2013 | Vaitheeswaran | .. | G06F 17/30389 |
| | | | | 707/749 |
| 2013/0166598 A1* | 6/2013 | Vaitheeswaran | .. | G06F 17/30566 |
| | | | | 707/792 |
| 2014/0098104 A1* | 4/2014 | Kirknel | ................. | G06T 11/206 |
| | | | | 345/440.2 |

OTHER PUBLICATIONS

Farber, Franz et al., "SAP HANA Database—Data Management for Modern Business Applications", SIGMOD Record, Dec. 2011, vol. 40, No. 4, pp. 45-51.

* cited by examiner

*Primary Examiner* — Richard Bowen
(74) *Attorney, Agent, or Firm* — Dilworth IP, LLC (57) ABSTRACT

Method and systems may be used to provide search results in response to plain language queries from a database. A search query may be received and a database may be queried. A metadata search of the database data structures may be performed to determine a search set based on the search query. Using the search set, a data search may be performed to determine the database data structures for a result set. Result data structures may be generated based on the result set. The result data structures may be iteratively provided to a client to display the search results responsive to the search query quickly. The relevant data may be retrieved from the database in response to a selection. In some instances, the results retrieved from the database in response to a selection of a result data structure may be limited based on a count parameter.

17 Claims, 9 Drawing Sheets

| | Category | Line | City | State | Date | Quantity Sold | Sales Revenue |
|---|---|---|---|---|---|---|---|
| 1 | 2 pocket shirts | Shirt Waist | Houston | Texas | 2010-01-01 | 1 | 129.0 |
| 2 | Belts, bags, wallets | Accessories | Austin | Texas | 2010-02-05 | 29 | 5011.8 |
| 3 | Bermudas | City Trousers | Dallas | Texas | 2010-09-06 | 147 | 18634.0 |
| 4 | Casual dresses | Dresses | Los Angeles | California | 2010-04-07 | 67 | 10351.8 |
| 5 | Day wear | Outerwear | Chicago | Illinois | 2010-08-02 | 83 | 8304.3 |
| 6 | Fancy fabric | Jackets | Miami | Florida | 2010-05-06 | 26 | 3198.6 |

SYSTEMS AND METHODS FOR SEARCHING DATA STRUCTURES OF A DATABASE

BACKGROUND

Entities, such as businesses, may utilize backend systems to store big data. Such data may be used, in some instances, for analysis and/or reporting for the entity. Such analysis and/or reporting may be done by manually identifying the database data structures of the backend system that contain the relevant data for the analysis and/or reporting. For instance, a report designer may identify a particular database data structure and relevant aspects of the database data structure to be included in the report using a reporting application. The reporting application may generate a query to retrieve the identified data from the backend system for inclusion in the report.

SUMMARY

One implementation relates to a method for providing search results. The method may include receiving a search query and querying a database having several database data structures based on the search query. A first result data structure for a first database data structure may be generated based on the query of the database. A first search result request may be received and, in response, data indicative of the first result data structure may be outputted. A second result data structure for a second database data structure may be generated based on the query of the database, and, in response to a second received search result request may, data indicative of the second result data structure may be outputted.

Another implementation relates to a system having a tangible computer-readable storage device having instructions and one or more data processors coupled to the storage device and configured to execute the instructions to perform several operations. The operations may include parsing a search query into a set of search terms. A database having several database data structures may be queried in parallel based on the set of search terms. Each database data structure may include a metadata term and associated data. A query procedure for the operation of querying the database may include determining if a search term of the set of search terms matches a portion of the metadata term for each database data structure, determining if the metadata term is associated with a measure, and identifying the database data structure as part of a search set if the metadata term is associated with a measure. A result data structure for each database data structure of the search set may be generated, and data indicative of each generated result data structure may be outputted.

Yet a further implementation may include a method for providing search results in response to a search query. The method may include generating a result data structure associated with a database data structure in response to a search query. The result data structure may include a dimension portion. A count parameter for the dimension portion may be received, and a database may be queried for data, limited by the count parameter, of the database data structure associated with the result data structure. The returned data may then be outputted.

BRIEF DESCRIPTION OF THE DRAWINGS

Various embodiments taught herein are illustrated by way of example, and not by way of limitation, in the figures of the accompanying drawings, in which.

It will be recognized that some or all of the figures are schematic representations for purposes of illustration only. The figures are provided for the purpose of illustrating one or more implementations with the explicit understanding that they will not be used to limit the scope or the meaning of the claims.

DETAILED DESCRIPTION

The following is merely provided for example purposes with the explicit understanding that the examples described herein will not be used to limit the scope or the meaning of the claims.

I. Overview

In some instances, entities, such as businesses, may utilize a platform having a database to handle big data and provide real time results to assist in making business decisions. Such platforms may be able to compute and process massive operational and/or transactional data in parallel using the resources of the platform. Such data may be used to create on-the-fly aggregations and ad-hoc reporting by using the columnar data storage of the platform. For example, it may be useful to create different data models or data structures, such as analytic views or calculation views, on top of relational column tables for further analysis on the data. A user of the database may create such data structures to harness and transform this data into useful information.

Analytics tools may be utilized to access and perform data analysis using such data structures of the database. For example, a reporting application may be designed to access a data structure of the database and return desired aspects of the data structure for presentation in the report. For instance, a report designer may specify a database data structure that provides sales data for various states over certain periods of time (e.g., quarterly sales of states for the past five years along with other information). However, in some instances, a plethora of database data structures may be present in the database and a user may not necessarily know of all of the database data structures. Accordingly, it may be useful to provide a system such that a user may search the database by asking business related questions in plain language and receive relevant results in a timely manner.

Moreover, it may be useful to provide results as soon as possible to the user rather than waiting for the search to complete. Such quick results may permit the user to determine that a particular result is responsive to their request and select the result without having to wait for the other results to be presented. For instance, it may be useful to incrementally provide results as they are generated. It may also be useful to initially provide results without including the underlying data. Thus, the system may reduce the data needed to be transferred to a user's client and may also speed up the presentation of the results to the user. Further still, in some instances, it may be useful to provide an indication of the ranking of the results based on their responsiveness to the business related question. Thus, a user may determine which results are most responsive to their query and can select that result and/or modify their query based on the results. For instance, the user may act on the search results by adding or removing attributes of the data structure (i.e., non-measurable qualitative descriptive data, such as a particular state, a particular business division, etc.) or drilling through the dimensions of the data structures (i.e., classification groups whose content is logically connected, such as country sales, state sales, city sales, etc.).

An example of systems and methods for implementing the foregoing will now be described in greater detail.

Figure 1:
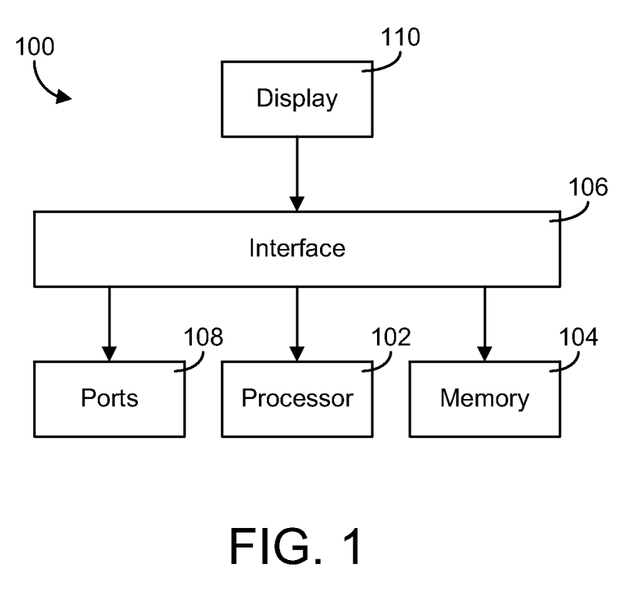
FIG. 1 is a block diagram of an example computing device.

A computing device 100, shown in FIG. 1, may be used to implement the systems and methods in accordance with the implementations described herein, as either a client or as a server or plurality of servers. Computing device 100 may include, but is not limited to, digital computers, such as laptops, desktops, workstations, personal digital assistants, servers, blade servers, mainframes, cellular telephones, smart phones, mobile computing devices (e.g., a notepad, e-reader, tablet, netbook, etc.), etc.

Computing device 100 includes a processor 102, memory 104, an interface 106 and ports 108. Each of the components 102, 104, 106, and 108, are interconnected using various busses, and may be mounted on a common motherboard or in other manners as appropriate. The processor 102 can process instructions for execution within the computing device 100, including instructions stored in the memory 104 to display graphical information for a GUI on an external input/output device, such as display 110 coupled to interface 108.

In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, a multi-processor system, etc.). The ports 108, which may include various communication ports (e.g., USB, Bluetooth, Ethernet, wireless Ethernet, etc.), may be coupled to one or more input/output devices, such as a keyboard, a mouse, a pointing device, a scanner, etc., or a networking device (a switch, adapter, bridge, router, hub, repeater, etc.).

The processor 102 may provide, for example, for coordination of the other components of the device 100, such as control of user interfaces, applications run by device 100, and wireless communication by device 100. Processor 102 may communicate with a user via interface 106 (e.g., control, display, external, etc.), coupled to a display 110. The display 110 may be, for example, a TFT (Thin-Film-Transistor Liquid Crystal Display) display, an OLED (Organic Light Emitting Diode) display, other flexible display, etc. The interface 106 may include circuitry for driving the display 110 to provide graphical, textual, and other information to a user. The interface 106 may receive commands (e.g., voice-activated, text, etc.), from a user and convert them to provide to the processor 102.

In addition, the interface 106 may be provided to communicate with processor 102 and enable near area communication of device 100 with other devices. The interface 106 may provide, for example, for wired communication. In some implementations, multiple interfaces may be used. Computing device 100 may communicate wirelessly through interface 106, which may include digital signal processing circuitry where necessary. Interface 106 may provide for communications under various modes or protocols, such as GSM voice calls, SMS, EMS, or MMS messaging, CDMA, TDMA, PDC, WCDMA, CDMA2000, or GPRS, etc. Such communication may occur, for example, through a radio-frequency transceiver. In addition, short-range communication may occur, such as using a Bluetooth, WiFi, or other such transceiver. In addition, GPS (Global Positioning System) receiver module may provide additional navigation- and location-related wireless data to device 100, which may be used as appropriate by applications running on device 100. The device 100 may also be provided with a storage device to provide additional storage, e.g., solid-state flash media. Each of the components may be interconnected using various buses. Several of the components may be mounted on a common motherboard or in other appropriate manners.

The memory 104 stores information within the computing device 100. In one implementation, the memory 104 is a volatile memory unit or units. In another implementation, the memory 104 is a non-volatile memory unit or units. In yet another, the memory 104 comprises both volatile memory units and non-volatile memory units. The memory 104 may also be another form of computer-readable medium, such as a magnetic or optical disk. The memory 104 may be capable of providing mass storage for the computing device 100. In one implementation, the memory 104 may be or contain a computer-readable medium, such as a floppy disk, CD-ROM, DVD, magnetic disk, memory chip, ROM, RAM, EEPROM, EPROM, flash memory or other similar solid state memory device, or an array of devices, including devices in a storage area network or other configurations.

A computer program product may be tangibly embodied in an information carrier. The computer program product may also contain instructions that, when executed, perform one or more methods, such as those described below. The information carrier is a computer or machine-readable medium, such as the memory 104, memory on processor 102, etc. Expansion memory may be provided and connected to device 100 through interface 106. The processor 102 and memory 104 or other memory (e.g., inside the processor) may form a processing circuit or processing module for completing the activities described herein.

Figure 2:
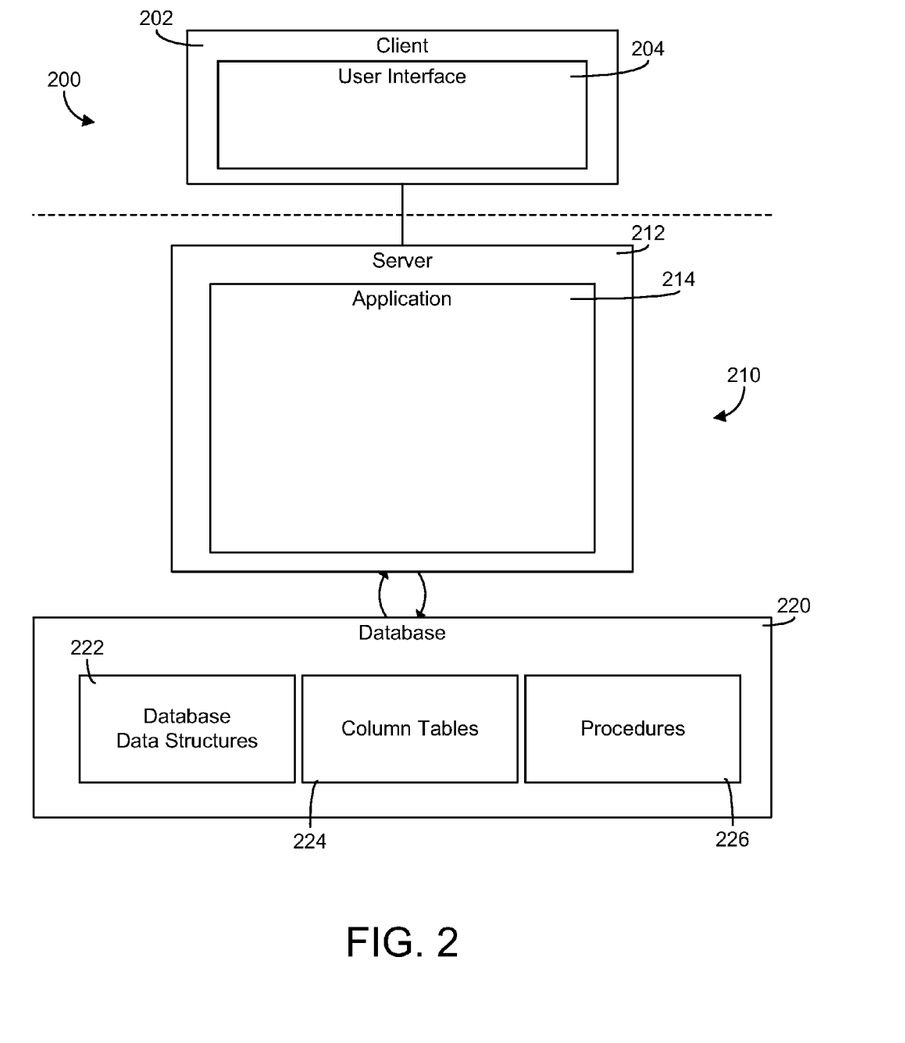
FIG. 2 is a block diagram of a example system having a client, a server, and a database.

FIG. 2 depicts an example system 200 that may be used by an entity. The system may include a client 202 and a backend system 210 associated with a database 220. The client 202 may be a computing device, such as computing device 100 of FIG. 1. The client may include a user interface 204 for accessing and/or otherwise interacting with the backend system 210. For example, the user interface 204 may be provided by a local application, a web application, and/or any other method for allowing a user of the client 202 to provide input and receive output from the backend system 210. In one instance, the user interface 204 may be provided via HTML5 or JavaScript on a web browser of the client 202. Of course other ways of providing a user interface 204 may be implemented as well.

The backend system 210 of the present example comprises a server 212 having an application 214 for implementing the searching processes and methods described herein. The server 212 may be a computing device, such as computing device 100 of FIG. 1, and/or the server 212 may be configured otherwise. In some instances, the server 212 may comprise several computing devices, such as a cloud server, etc. The application 214 is configured to interface with the client 202 and receive and transmit input and/or output to the user interface 204 of the client 202. The application 214 may be configured to perform several operations and/or processes, such as those described below, for interacting with the database 220 and the client 202. In one example, the application 214 may include a server side JavaScript application, such as a business intelligence application.

As shown in FIG. 2, the server 212 is communicatively coupled to a database 220 to transmit and/or receive data from the database 220. The database 220 may be local to the server 212 or may be remote from the server 212. In some instances, the server 212 having the application 214 may be at one location while the database 220, which may be very large in size to form a data warehouse, may be located at a different location. The database 220 of the present example may comprise a separate computing device, several computing devices, a tangible computer-readable data storage device, several tangible computer-readable data storage devices, etc. The database 220 is configured to store data, such as big data, and/or other data. In the present example, the database 220 includes database data structures 222, column tables 224, and procedures 226. The column tables 224 may be used for columnar data storage, such as operational and/or transactional data. Such data may be used for business analytics and/or other purposes.

The database data structures 222 may include data models for viewing, analyzing, calculating, and/or otherwise interacting with the data of the column tables 224. For example, a data structure 222 may be used to collect all the data of the column tables 224 relating to sales transactions to provide total sales data by state, by city, by store, etc. Of course other database data structures 222 may be used to interact with and/or otherwise utilize the data of the column tables 224.

The procedures 226 may be stored procedures for interacting with the database data structures 222 and/or column tables 224. For example, the procedures 226 may include procedures for performing a metadata search of one or more database data structures 222, procedures for performing a search of the data of one or more database data structures 222, and/or other procedures. In some instances, the procedures 226 may be run and/or created in response to a request from the application 214 of the server 212. The procedures 226 may be run directly in the database layer such that several procedures 226 may be run in parallel during the execution of a query, as will be discussed in greater detail below.

II. Example Search System and Method

Figure 3:
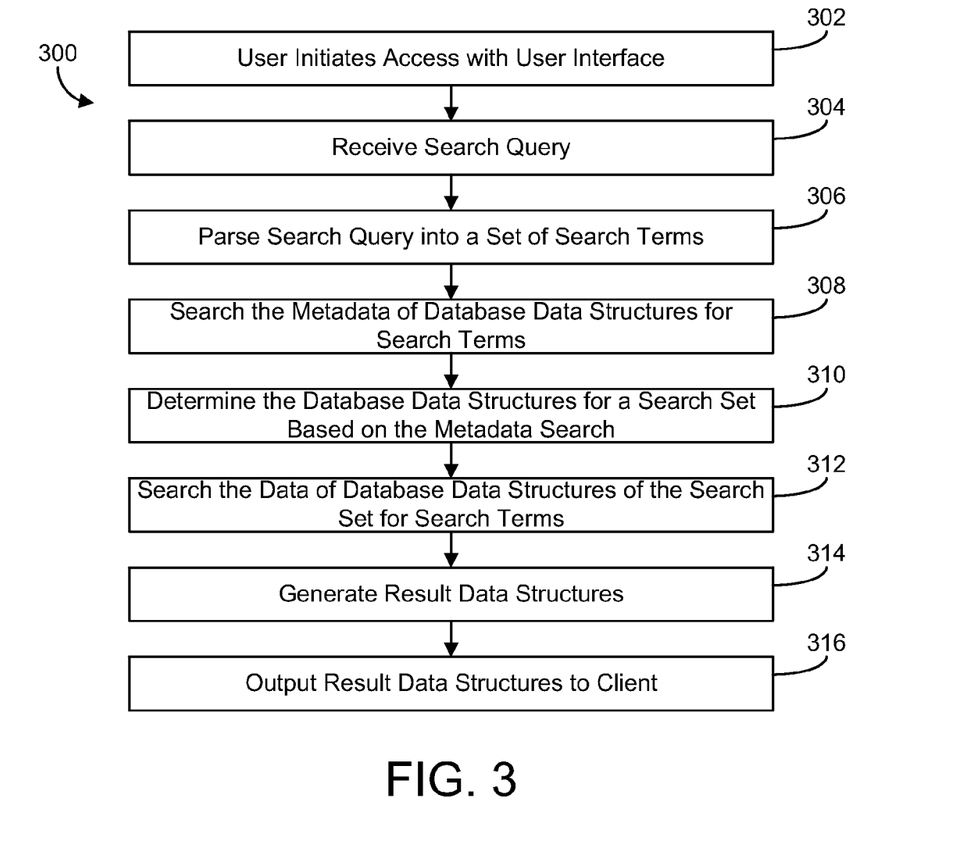
FIG. 3 is a flow diagram of an example method for searching a database.
Figure 4:
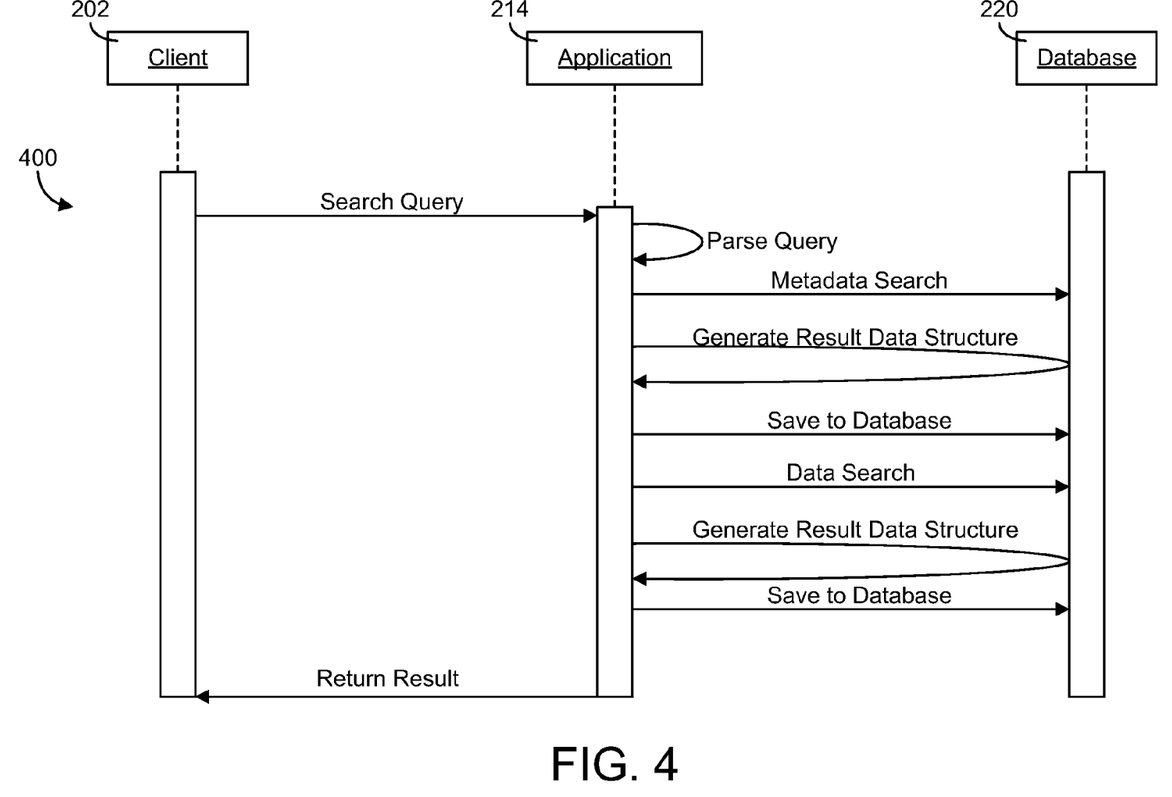
FIG. 4 is a process diagram of the example method of FIG. 3 for searching a database.
Figure 7:
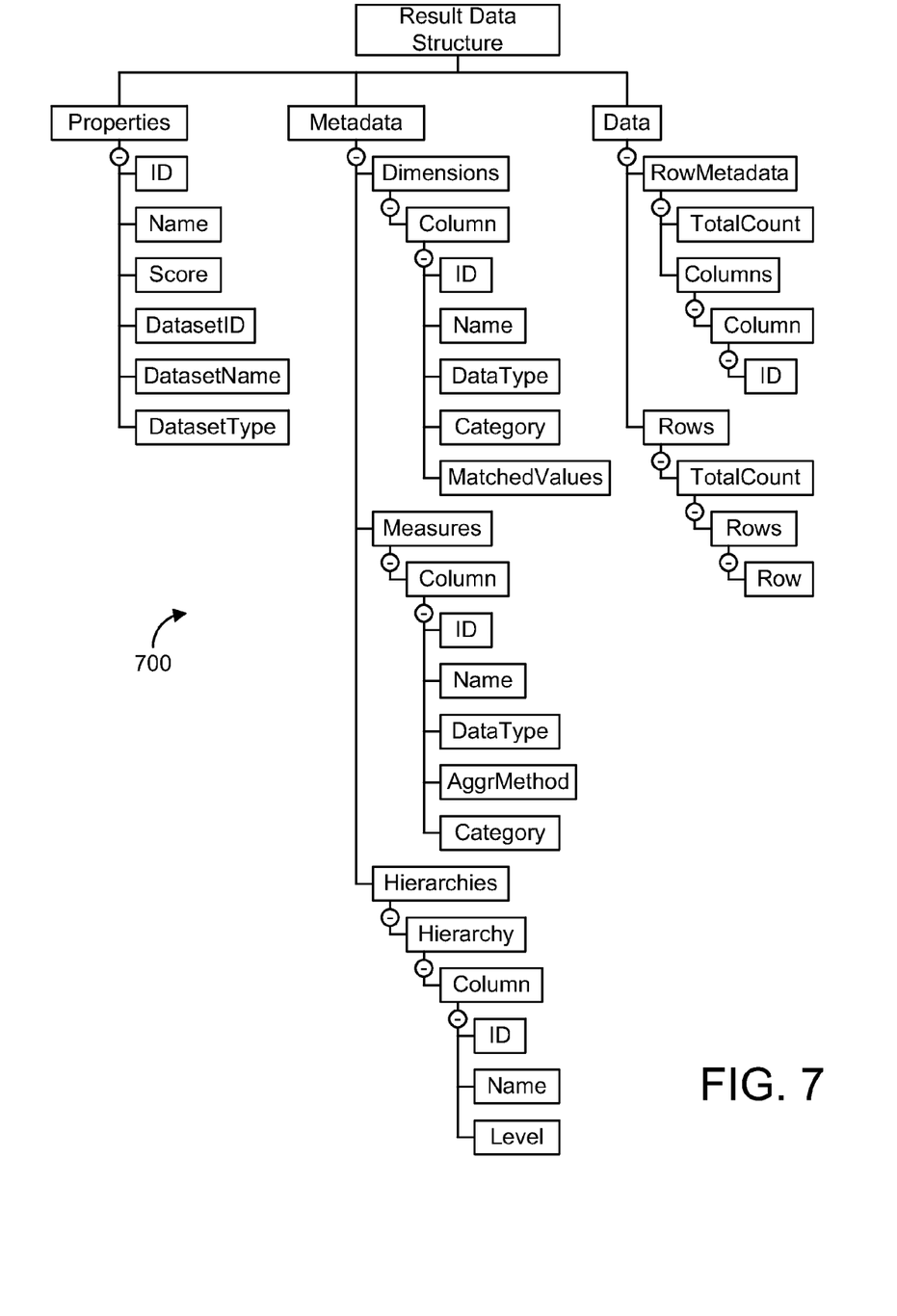
FIG. 7 is an overview of an example result data structure.

FIG. 3 depicts an example flow diagram for a method 300 for searching database data structures of a database, such as database 220 of FIG. 2. FIG. 4 depicts an example process 400 implementing the method 300 to generate result data structures, an example of which is shown in FIG. 7, that may be used to display search results. A user may initiate access with a user interface, such as user interface 204, for entering a search query (block 302). In one example, the user may login to a web application and/or local application. When the user initially accesses the user interface, the user interface may interface with an application, such as the application 214 on the server 212. Based on the user's access level, the application may interface with a database having several data structures to determine which data structures the user has access to and may enable those data structures for searching. For instance, when the user initiates access to the user interface 204, the application 214 may cause the database 220 to create a metadata procedure for searching the metadata of the database data structures 222 of the database 220 and create several data procedures for searching the data of the database data structures 222. In some instances, the number of data searching procedures may correspond to the number database data structures that have been enabled for searching. Further still, it should be understood that the procedures for searching the metadata and the data are run at the database layer such that the searching may take advantage of the resources and parallelization capabilities of the database 220 for performing the search. Thus, once a search query is received, the procedures may be rapidly performed at the database layer to return relevant results quickly to the user.

A search query may be received by the application 214 from the client 202 (block 304). For example, the search query may be entered into a text box of user interface 204 and/or received though other methods (e.g., text converted from speech, etc.). The inputted search query may be parsed into a set of search terms (block 306). For example, each word of the inputted search query separated by a "space" may be identified and separated. The stop words of the search query may also be removed, thereby resulting in a set of search terms. For example, if the user inputs a search query for "Sales in Texas," the search query may be separated into the three words, "Sales," "in," and "Texas." The stop words, such as "in," may be removed to result in a set of search terms "Sales" and "Texas." In one implementation, a parsing module of the application 214 may receive the search query and allocate each word of the search query as a separate element of an array. The search module may iterate over all the word elements of the array to compare each word to an array of stop words. If the word is not found in the stop words array, the word is added to an array for the set of search terms. If the word is found in the array of stop words, the search module does not add the word to the array for the set of search terms and moves onto the next word element of the array. Of course, in some instances, the stop words may not be removed and all terms, including the stop words, may be in the set of search terms.

Upon parsing the search query into a set of search terms, a metadata search of the database data structures for the search terms may be performed (block 308). In one implementation, the search terms may be passed to an SQL script procedure, which may be included in the procedures 226 of the database 220, that determines if any of the search terms match any metadata terms in the metadata of the database data structures (e.g., the terms in the column names). For each term, the procedure may convert the term to lowercase and may append a wild card character at the beginning and end of the term. The SQL query may then be executed to match the term against the metadata of the database data structure, such as a master list of column names or the like. When a match is indicated, the metadata search procedure can return information to identify the matched portion of the database data structure. For example, the returned information may include an identifier for the space where the database data structure is located, an identifier for the database data structure, an identifier for the matched column name, and/or a unique identifier for the matched column. The search term and the returned information may be added to a map data structure of key value pairs, described in greater detail below in reference to FIG. 6, that may be used to determine a search set of database data structures.

Figure 5:
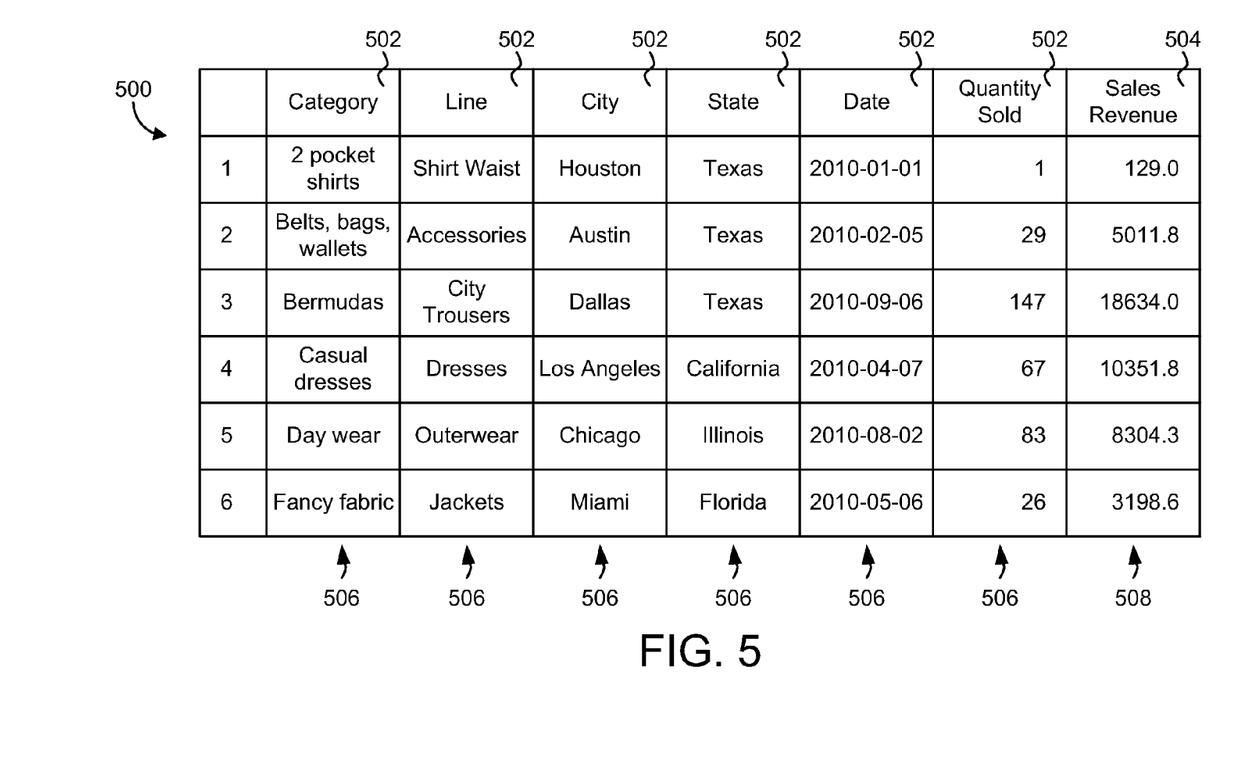
FIG. 5 is an overview of an example database data structure of the database.

Using the prior example of a search query that is parsed into a set of search terms of "Sales" and "Texas," the metadata search procedure may include comparing the terms "Sales" and "Texas" to the metadata terms in the metadata of each of the database data structures. FIG. 5 depicts an example database data structure 500, such as a data table, that may be searched. The database data structure 500 of the present example includes metadata 502, 504, dimension data 506, and measure data 508. The metadata 502, 504 in this example comprises several column names, though other metadata may be used as well.

A column pertains to a measure of the database data structure 500 if the column contains data that is the numerical data that is being analyzed, calculated, and/or otherwise utilized by the database data structure 500. In the present example, the column having measure data 508 and with the column name 504 for "Sales Revenue" pertains to the numerical data that is the subject of the database data structure 500.

A column pertains to a dimension of the database data structure 500 if the column contains data that is descriptive or otherwise provides contextual information for the measure data 508, e.g., a state the measure data 508 came from, a quarter that measure data 508 occurred in, etc. In the present example, several columns of dimensional data 506 is provided with various column names 502 providing a description of that dimensional data 506.

Using the search terms "Sales" and "Texas," the metadata search of the database data structure 500 may indicate a hit and/or match for the search term "Sales" with the column name 504 of "Sales Revenue." The metadata search for the search term "Texas" in this example may not indicate any hits or matches, because no column names 502, 504 contain the word "Texas." Based on the match for the search term "Sales," the search term "Sales" and the related information for the column name 504 for "Sales Revenue" may be added to a map data structure to be used to determine a search set of database data structures.

In some implementations, if more than five search terms are included in the set of search terms, then the metadata search procedure may utilize the five terms for a first metadata search procedure to sequentially search the metadata of each database data structure. Subsequent sets of five or less search terms may be used in a second metadata search procedure. Accordingly, the metadata search procedures may be performed in parallel to quickly return results from the metadata search. For example, if six terms are present in a set of search terms, the first five terms may be used in a first metadata search procedure and the sixth terms is used in a second metadata search procedure. It should be noted that the number of search terms per metadata search procedure may be increased or decreased.

Figure 6:
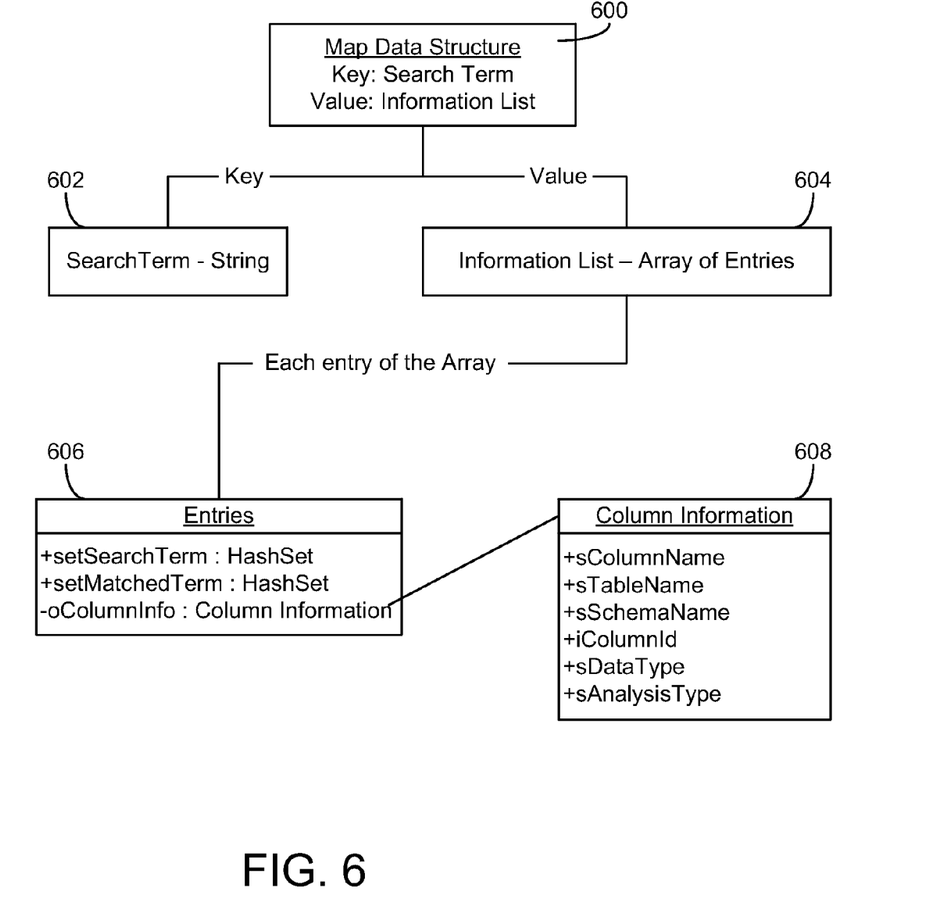
FIG. 6 is an overview of an example map data structure generated during the query of the database.

Referring to FIG. 6, when a search term is determined to match a metadata term of a database data structure, the search term and any returned information for the matched column of the database data structure may be used to construct a map data structure 600 of key-value pairs. The map data structure 600 may include a plurality of key-value pairs for each hit for each search term encountered by the metadata search procedure. Accordingly, it should be appreciated that the map data structure 600 may provide a set of all the metadata search term hits and any returned information for the column of the database data structure that the search term matched.

In the present example map data structure 600, the search term is the key 602 and an information list of information of the matched column is the value 604. As shown in FIG. 6, the value 604 may include several entries 606 in an array, such as a search term hash set, a matched term hash set, and any returned column information 608. The returned column information 608 may also be an array having several entries providing information about the matched column of the database data structure. Such information may include a column identifier, a database data structure identifier, an identifier for the schema, a unique column identifier, a data type of the column, an analysis type of the column, and/or any other information. The column information 608 may also include an identifier to indicate whether the column information pertains to a measure or a dimension of the database data structure. In the example provided above for "Sales Revenue," the identifier may indicate the column as pertaining to a measure.

Utilizing the information from the map data structure 600, an initial result data structure 700, shown in FIG. 7, may be generated for each key-value pair and may be stored in the database. The result data structures 700 may be data models that identify one or more dimensions and/or measures of a corresponding database data structure based on the match of one or more of the search terms. The information that may populate the result data structures 700 will be described in greater detail below. Of course, in some implementations the result data structures 700 may not be generated and/or stored after the metadata search.

Referring back to FIG. 3, with the map data structure 600 constructed, the method 300 may further include determining the database data structures for a search set based on the metadata search (block 310). In one implementation, a determination may be made of which values of the map data structure 600 have columns identified as pertaining to a measure. If the column is identified as pertaining to a measure, then the name of the database data structure may be added to an array of database data structures, such as a search set.

The identification of database data structures that have a measure may be used to reduce the scope of a subsequent data search of the database data structures, described in greater detail below, such that the speed of the search process may be increased. If a database data structure has metadata that matches a search term, but none of the matched columns pertains to a measure, then the database data structure may not have data that the user may consider responsive to the search query.

In some implementations, the array of identified database data structures for the search set may be ordered based on the number of metadata hits. For instance, a database data structure having several metadata hits may be more relevant to the search query than a database data structure having a single metadata hit. Accordingly, ordering the database data structures based on the number of metadata hits may be useful to prioritize the data searching of the database data structures. In other implementations, other criteria may be used to order the database data structures of the search set. For example, a score may be determined based on the quality of the matching of search terms to the metadata terms of the database data structures. In one example implementation, an exact match score may be ranked first if there is an exact match between a search term and a value, such as "new" matching "new," a word match score may be ranked second if there is a match between a search term and a word of a value, such as "new" matching the word "new" of "new york," and a partial match score may be ranked third if there is a match between a search term and a part of a word of the value, such as "new" matching a portion of "devnew." If a search term matches multiple values, such as "new" matching "new york" and "devnew," then the highest score for the match may be used. Of course still other criteria may be used to order the database data structures of the search set.

Referring back to FIG. 3, the method 300 may further include searching the data of the database data structures of the search set for the search terms (block 312). In one implementation, a data search procedure may involve comparing the search terms to the data of each database data structure of the search set. An SQL script procedure, which may be included in the procedures 226 of the database 220, may be used to determine if any of the search terms match any data entries in the associated data of the database data structure. Similar to the metadata search, for each term, the procedure may convert the term to lowercase and may append a wild card character at the beginning and end of the term. The SQL query may then be executed to compare the search term against the data entries of the associated data of the database data structure. If a search term is found to match a value in the associated data of the database data structure, then the database data structure may be identified as part of a result set.

For example, the search terms "Sales" and "Texas" may be compared to the dimension data 506 and/or measure data 508 of the database data structure 500 of FIG. 5 to determine if either or both of the terms matches a data entry. As shown, the term "Texas" appears in three times in a dimension column for named "State." Accordingly, the database data structure 500 may be identified as part of the result set. The matched search term and returned information for the matched column of the database data structure may be added as a key-value pair to a map data structure, such as map data structure 600.

In some instances, a limiting parameter may be utilized to limit the search of the data. Such a limiting parameter may be useful to break out of the search of the data if a search term appears hundreds or thousands of times in the data. Accordingly, the query of the data for a database data structure may be stopped once a number of matches are found that equal the limiting parameter.

Additional data may also be returned with the data search procedure. For example, a column identifier where the matched search term is located may be included such that a subsequent request for the data may be quickly retrieved. In addition, a grouping ID may be used to identify the location of the column information when there is a search term hit. The grouping ID may be a decimal number generated by treating a bit vector as a binary number. For instance, in the example shown in FIG. 5, the search term "Texas" appears in the fifth column, so the bit vector may be 11110, where 1 is indicative of no search hit and a 0 is indicative of a search hit. The decimal equivalent of 11110 is 30. Thus, a condensed value may be used to efficiently identify the location of an identified search term in the data of the database data structure. Of course the foregoing is merely and example and other methods may be used and/or the grouping ID may be omitted.

Also similar to the metadata search, if more than five search terms are included in the set of search terms, then the data search procedure may utilize the five terms for a first data search procedure to sequentially search the data of each database data structure. Subsequent sets of five search terms or less may be used in a second or subsequent data search procedures. Accordingly, the data search procedures may be performed in parallel to quickly return results. For example, if six terms are present in a set of search terms, the first five terms may be used in a first data search procedure and the sixth terms is used in a second data search procedure. It should be noted that the number of search terms per data search procedure may be increased or decreased.

Referring back to FIG. 3, once the database data structures have been identified via the metadata search and the data search, result data structures 700 may be generated (block 314). As shown in FIG. 7, a result data structure 700 may include a properties object 710, a metadata object 720, and a data object 730. In some instances, the data object 730 may not be populated until a user selection associated with the result data structure is received, as will be discussed below.

The properties object 710 may include such information as a unique identifier for the result data structure 700, a display name for the result data structure 700, a score relative to the search query, an identifier associated with the database data structure associated with the result data structure 700, a name of the associated database data structure, a type of the associated database data structure, and/or any other information.

The score may be used to rank the result data structures 700 so that the result data structures can be displayed on the client 202 in an order based on their score. In one implementation, the score for a result data structure 700 may be based on a sum of all the scores assigned to the dimensions and measures of the result data structure 700. Such scores may be based on how well a search term matches the matched value. For example, an exact match score may be ranked first if there is an exact match between a search term and a value, such as "new" matching "new." A word match score may be ranked second if there is a match between a search term and a word of a value, such as "new" matching the word "new" of "new york." A partial match score may be ranked third if there is a match between a search term and a part of a word of the value, such as "new" matching a portion of "devnew." If a search term matches multiple values, such as "new" matching "new york" and "devnew," then the highest score for the match will be used.

The scores may be boosted or otherwise increased and/or decreased based on other factors. For instance, a column match boost may increase the score if the metadata for a dimension column matches a first search term and the metadata for a measure column matches a second search term. Such a match may indicate that the database data structure may be what the user is searching for. Multiple search terms matching the same column may also be given a boost (e.g., the search terms "new" and "city" being matched with the same dimension column).

The metadata object 720 of the result data structure 700 may include one or more dimension portions 722, one or more measure portions 724, hierarchy information 726, and/or other data. The metadata object 720 may be populated using the data from the key-value pairs identified during the metadata search and the data search for the database data structures of the result set. The key-value pairs may initially be sorted based on their associated database data structures to aggregate key-value pairs for the same database data structure. The result data structures 700 may then be populated using the data of the key-value pairs. The dimension portion 722 may be populated with column information for any dimension columns found during the metadata search and/or the data search. The measure portion 724 may likewise be populated with column information for any measure columns found during the metadata search and/or data search.

In the present example, the dimension portion 722 may include a column identifier for the database data structure, a column name, a data type (e.g., string, varchar, etc.), a category (such as for identifying special dimensions such as time of geographic dimensions), and/or a matched identifier for indicating that a search term exactly matched a term of the dimension.

The measure portion 724 may include a column identifier for the database data structure, a column name, a data type (e.g., string, varchar, etc.), and/or an aggregation method to be applied to the measure (such as a sum, average, etc.).

The hierarchy portion 726 may be populated with additional information pertaining to a hierarchy associated with the result data structure 700. For example, the hierarchy information may be used if hierarchies are defined in the database data structure associated with the result data structure 700.

The data object 730 may be populated in response to a user selection indicating a selection of the result data structure 700. For instance, the data object 730 may be populated based on a result set obtained by executing an SQL query for data based on information of the metadata object 720, as will be described below.

Referring back to FIG. 3, with the result data structures generated, the result data structures 700 may be outputted (block 316). The results data structures 700 may be transmitted to the application 214 to be outputted to the client 202 for display via the user interface 204. For example, the display name for the result data structure 700 from the properties object 710 may be displayed to the user via a display, such as display 110 of FIG. 1. Additional information about the result data structures 700 may also be displayed to provide the user with context about the result data structure 700, such as the score, the number of dimensions and/or measures, etc. In some instances, the result data structures 700 may be outputted once all the result data structures 700 have been generated.

Figure 8:
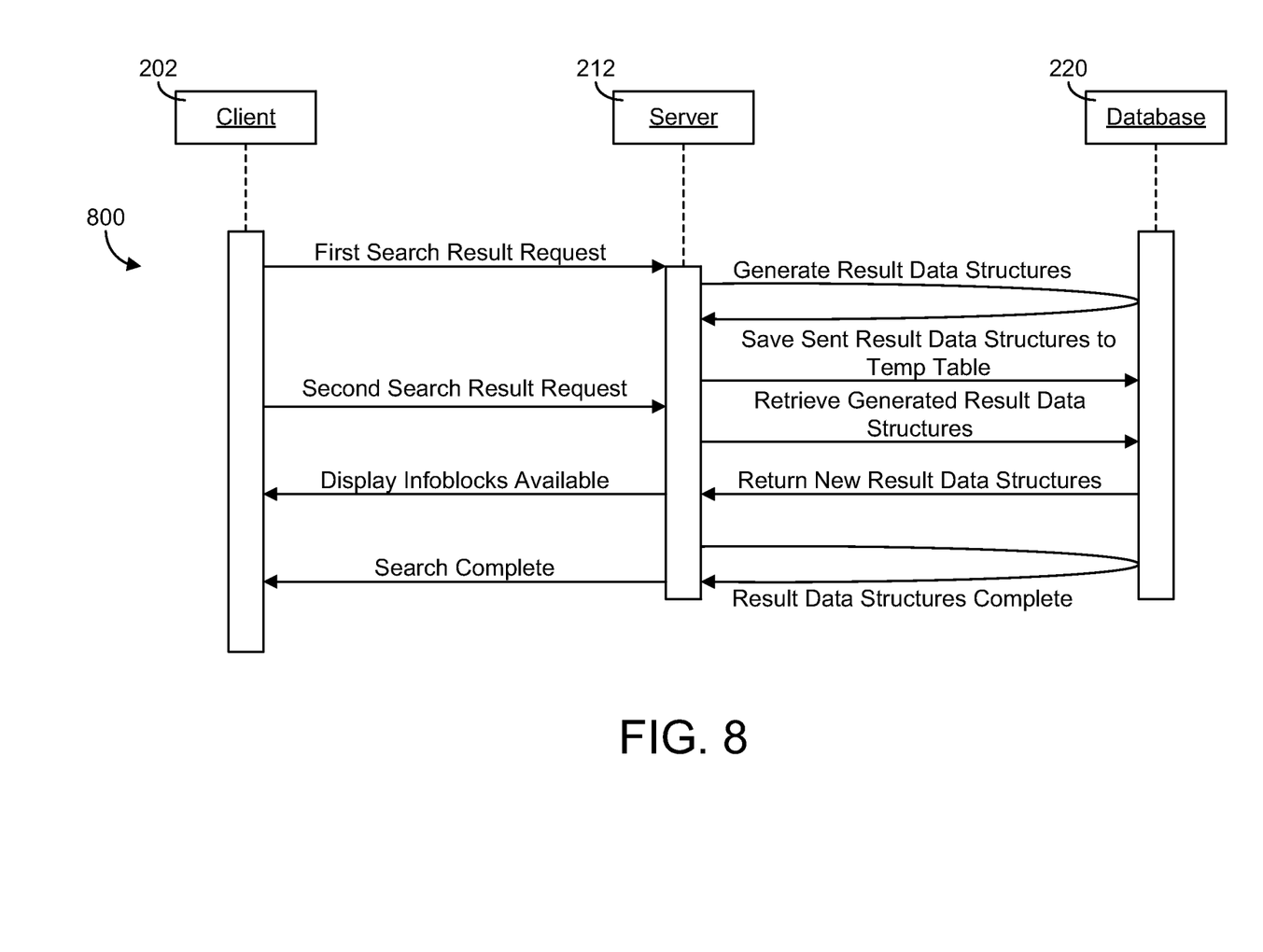
FIG. 8 is a process diagram of an example process for incrementally providing search results.

In other instances, the result data structure 700 may be outputted in response to a search result request. For example FIG. 8 depicts and example process 800 for providing incremental search results in response to a search query. The client 202 may periodically send a search result request to the server 212 such that any generated result data structures 700 can be provided for the user to view while other result data structures 700 are being generated. Such incremental result generation may allow a user to consume the results of the search as they become available. Additional result data structures 700 may be retrieved by the client 202 by periodically polling the application 214 after the search query has been sent.

As an example, a client 202 may submit the search query for "City Margin Sales." The client 202 may transmit the search query request to the server 212. In some instances, a request identifier may be used to distinguish a request from several other requests. The request identifier may be generated by the client 202 and sent with the search query or the request identifier may be generated at the server 212 and associated with the search query. The application 214 of server 212 may thus be able to differentiate between multiple search requests. When the search request is received, the procedures to query the database data structures may be ran and result data structure 700 may begin to be generated and returned to the application 214 of server 212. When a result data structure 700 is completely generated, the application 214 may update a table that stores the information about the generated result data structures. The table may store an index value for each result data structure 700 (e.g., a sequential numbering), a unique identifier for the result data structure 700, the metadata object information of the result data structure 700, the unique request identifier, a score for the result data structure 700, a timestamp indicating when the search query was received, and/or any other information.

The client 202 can incrementally poll the application 214 of the server 212 for result data structures 700 by sending the request identifier, a start index, and an end index. In some instances the incremental polling may be based on a predetermined time, such as every 200 ms, or may be in response to a user input. The indicies may be used to retrieve new result data structures 700 within the range created by the provided the start index and the end index. Of course other indicies and/or other manners of tracking the number of returned result data structures 700 may be used.

In some instances, additional parameters may be provided with the result data structures 700. For example, a total count value, which is indicative of the total number of result data structure 700 that have been generated, and a hit count value, which is the number of result data structures 700 that are being sent in response to a particular search result request. If no result data structures 700 are returned in response to a search result request, the client 202 may send the same polling request again at a predetermined time later or in response to a user input. Once the client 202 has received one or more result data structures 700 in response to a polling request, the client 202 may display data representative of the returned result data structures 700 and/or data from the returned result data structures 700 on a display of the client 202.

The search result request polling may be terminated in response to one of two conditions. First, if all the result data structures 700 responsive to the search query have been sent, then client 202 may stop polling. For example, data may be transmitted indicating that all result data structures 700 have been sent. Such data may include a total count of result data structures 700 in response to a search result request. When the client receives the response to the search request, the client will stop sending further polling requests. If the response to the search result request is received and the client 202 can still display additional result data structures 700, then the client 202 may send one last polling request for any remaining result data structures 700 to fill the display areas. The second event that may cause the search result request polling to stop may be when the display areas for result data structures 700 on the client 202 have been filled. Any result data structures 700 that have not been sent to be displayed on the client 202 may have its information stored in the table if the user requests additional result data structures 700.

In some implementations, the result data structures 700 may be ranked and ordered by one or more parameters. Because result data structures 700 may not necessarily be generated in any particular order, the client 202 may request that the result data structures 700 be displayed according to a sorting parameter. One such parameter may include the score for the result data structures 700. As the result data structures 700 are sent to the client 202, a rank list may also be sent to the client 202 such that the results may be sorted as they are displayed. Accordingly, as the results are incrementally displayed, the results may also be displayed according to their rank as well. In other implementations, the rank list may be sent after the search is finished such that results may be displayed in order of their rank.

A user may consume the result data structures 700 by using the underlying data for plotting tables or charts using the semantic information. The result data structures 700 may also be used for advanced analysis by adding additional dimensions and measures. The result data structures 700 may further be used to drill and filter on existing dimensions. The result data structures 700 can be saved with other parameters, which can be retrieved for further analysis.

It should be understood that the result data structures 700 provided to the client 202 do not necessarily include the underlying data associated with database data structure. Accordingly the data transmitted to the client to display the search results may be reduced.

When data is requested for a particular result data structure 700, the metadata information of the metadata object 720 may be used to build a query, such as an SQL query, to retrieve the real time data from the database 220 associated with the result data structure 700. In one example, an SQL query generated from an result data structure 700 may have several subparts: a SELECT clause having all attributes of the result data structure 700 as part of the select list, an appropriate aggregation applied to the measure data, a WHERE clause having filters for matching values and time dimension requirements, a GROUP BY clause to group the aggregated results on one or more columns and an ORDER BY clause to order the dimensions of the result data structure 700 that takes care of distinct values and time hierarchies in the database 220.

In one instance, the SQL query generation may begin by retrieving the table name and schema name for the selected result data structure 700 from the metadata object 720 of the result data structure 700. Next, the dimensions and measures may be extracted and placed in an array. The dimensions of the metadata object 720 of the result data structure 700 may be iterated over such that each dimension is appended to the SELECT clause. Similarly, the measures of the metadata object 720 of the result data structure 700 may be iterated over to append the measures to the SELECT clause. Next, the WHERE clause may be built by iterating over all the filters and appending the filters using OR or AND between filters. In some instances, a time hierarchy query may be built to provide data according to a time hierarchy. For example, the returned data of interest may be all January, first quarter data for the years 2002 through 2006 may be desired. Thus, providing the time hierarchy may provide the relevant data. Once the SQL query is built, the database 220 may be queried and the results may be populate the data object 730 of the result data structure 700. The results may also be directly returned to the client 20 for the user to consume them. In addition, in some implementations, the populated result data structure 700 may stored for later access, such as a later request by the same user.

In some instances, it may be useful to filter or otherwise reduce the result data returned to the user to provide useful results without overloading the user with data. In one implementation, a count parameter may be used to allow a user to specify the amount of data that the user wants. The count parameter is the number of unique value dimensions that are allowed for each dimension in a result data structure 700. Along with the result data structure 700 data request, the client 202 may pass an integer value for the count parameter for each dimension column in the selected result data structure 700. The number of rows returned in response to the result request, such as an SQL query, may be limited by the count parameter. Starting with the lowest level dimension, data values may be selected up to the count parameter specified in the request. This is repeated for every higher level dimension.

Figure 9:
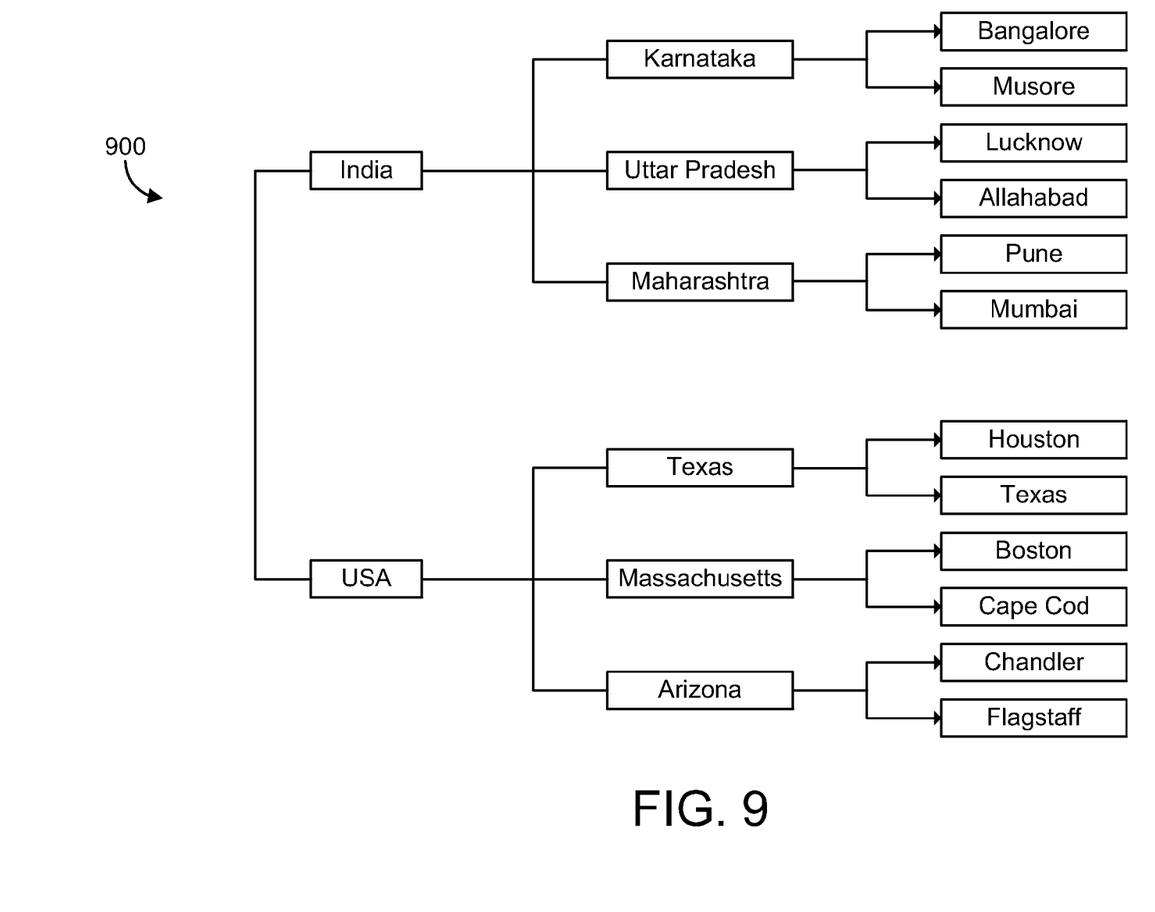
FIG. 9 is an overview of an example tree structure for returning data limited by a count parameter.

An example of data that may be limited by the count parameter is shown in FIG. 9. In the example shown, the user may set the count parameter for Country, State, and City as 2, 3, 2, respectively. The data returned in response to the request for data will limit the number of rows returned for each dimension (i.e., Country, State, and City). FIG. 9 illustrates a tree data structure 900 of a response that may be generated using the count parameter settings of 2 Countries, 3 States, and 2 Cities. In the tree data structure 900, two countries are represented at the lowest level. For each country three states are returned, and for each state, two cities are returned. Thus, the returned results may be limited. Such limited results may be useful if the visualization capabilities are limited and/or if voluminous results may be returned if the results are not limited.

In some instances, the full tree size may be determined by summing the count parameters for all levels together. In the example above, the tree size may be calculated using the function $\Sigma_{i=1}^{n} a_i * a_{i-1}$ where $a_i$ indicates the count parameter of $i^{th}$ order dimension and $a_0=1$. Therefore, referring to the example above, the tree size will be 2+3*2+3*2*2=20.

To populate the tree data structure 900, a procedure will start at the highest dimension, such as country in the present example, and will attempt to obtain the lower-order dimensions subtree for each top-level dimension. If a subtree is present, such as the state subtree in the present example, an attempt to obtain the subtree of the subtree will be made, such as city in the present example. The process may continue until no subsequent subtrees are found. The process may then populate the current subtree until the count parameter is met or no more results for the dimension are found. Once the count parameter is met or the results for the subtree are exhausted, a new parent node may be created. If a subtree is absent, a new parent node may also be created and add a row for the subtree. Referring to FIG. 9, the string value of "INDIA" will be used as a key and the lower dimensions will be the values for the key. Similarly, "USA" will be used as a key with the lower dimensions set as values. The procedure may then recursively check to see if the count parameter for each node is met. If it is not, the process will attempt to insert a row. Each row that is added will be marked as added and may be included in the result data structure 700 data object. Thus, the result data may be populate up to the group count parameter and the relevant results can be returned to the client 202 for the user to consume.

In some instances, a search query may return a single row data result, thereby indicating that a precise answer may be determined. This occurs when there are values in the search query and strict filtering is applied. Strict filtering converts the terms in a search query into filters and matches values against this filter. For example, if the search query is "Dallas Revenue" and the search query is executed against the database data structure 500 shown in FIG. 5, then the term "Dallas" will match a value under the City column 502 and the term "Revenue" will match the measure sales revenue column 504. Thus, a specific data result of 18634 may be provided.

However, such a specific answer may not necessarily be desirable by the user. If the user would like to compare the revenue numbers of Dallas to other cities, the user would need to enter a new search query for "City Revenue." In some instances, it may be useful to identify the matched query for "Dallas Revenue," but to provide a result data structure 700 for "City Revenue" such that the user may compare the revenue of Dallas to other cities. Thus, if the client 202 sets a count parameter to five, the first row will be the matched value for Dallas Revenue and the remaining four rows will be populated with other similar data from the result data structure 700, such as Houston Revenue, Austin Revenue, Los Angeles Revenue, and Chicago Revenue. In some instances, the matched value may be highlighted or otherwise visually differentiated from the other results to indicate a matched value.

In some implementations, time dimensions may be desired to be handled in different manners as well. Most data is associated with a time when it occurred (e.g., a day, week, month, quarter, year, etc. when the data occurred). There are many uses of for the time dimension, such as comparing the data of a particular period with another period, predicting future data based on past data, and drilling down from yearly data to more granular levels, such as monthly data.

The time dimensions may thus be desired to be treated differently from normal dimensions. If a time hierarchy is used in a database data structure, the time information may be used to enrich the data returned to the user in response to a search query. For example, if a database data structure includes a time hierarchy for year, quarter, and month for the data, then the year is considered the highest order time dimension for the data. If a search term results in a hit on the highest order time dimension, such as the year time dimension in the present example, then the aggregate data based on the year time dimension may be returned. Data for prior years may also be returned in response to the request such that the user may compare the data to prior, relevant data. The number of prior year may be limited by a count parameter (e.g., if the count parameter is 3, then the present year plus two prior years ay be provided in the data results).

If there is a search term hit on a lower order time dimension, such as in response to a search query for "Quarter Sales," then the higher time dimensions may be automatically included, such as the years. For lower time dimensions, a count parameter will be applied to the highest time dimension and the lower time dimension count parameters will be set to predetermined values (e.g., 4 for quarters, 12 for months, 30 for days, etc.). Accordingly, for the example of "Quarter Sales" with a count parameter of 3, then data for the current year and the prior two years for all four quarters will be returned.

In some implementations, strict filtering may be applied for the lower time dimensions such that the count parameter is applied to the lower time dimension. For example, for a search query for "June Sales" with a count parameter of 3, then the data for the most recent June and the Junes for the prior two years will be returned. Accordingly, when the user provides a specific lower time dimension query with a count parameter, the returned data does not provide the user with extraneous data for the other lower time dimensions.

The foregoing methods and/or systems may be implemented by one or more computer programs (e.g., programs, software, software applications or code), including machine instructions for a programmable processor, and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Controllers (PLCs) Programmable Logic Devices (PLDs)), used to provide machine instructions and/or data to a programmable processor. A "machine-readable medium" and "computer-readable medium" do not include transitory signals.

To provide for interaction with a user, the systems and techniques described here can be implemented on a computer having a display device (e.g., a CRT (cathode ray tube) or LCD (liquid crystal display) monitor), for displaying information to the user and a keyboard and a pointing device (e.g., a mouse or a trackball), by which the user can provide input to the computer. Other kinds of devices can be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The systems and techniques described here can be implemented in a computing system that includes a back-end component, a middleware component, or a front-end component, or any combination of back-end, middleware, or front-end components. The components of the system may be interconnected by any form or medium of digital data communication (e.g., a communication network). Examples of communication networks include a local area network ("LAN"), a wide area network ("WAN"), and the Internet.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for providing search results comprising:
receiving a search query;
querying, by the one or more processing modules, a database having plurality of database data structures based on the search query;
generating, by the one or more processing modules, a first result data structure for a first database data structure of the plurality of database data structures based, at least in part, on the querying of the database, wherein the first result data structure includes,
a first properties object including a first unique identifier for the first result data structure and a first score relative to the search query,
a first metadata object including data indicative of a portion of the first database data structure responsive to the search query, and a first data object including a total count value indicative of a total number of result data structures generated in response to the querying;

receiving a first search result request;

outputting, by the one or more processing modules, data indicative of the first result data structure in response to the first search result request;

generating, by the one or more processing modules, a second result data structure for a second database data structure of the plurality of database data structures based, at least in part, on the querying of the database, wherein the second result data structure includes, a second properties object including a second unique identifier for the second result data structure and a second score relative to the search query, a second metadata object including data indicative of a portion of the second database data structure responsive to the search query, and a second data object including total value indicative of a total number of result data structures generated in response to the querying;

receiving a second search result request; and outputting, by the one or more processing modules, data indicative of the second result data structure in response to the second search result request.

2. The method of claim 1, wherein the second search result request is received after a predetermined period of time.

3. The method of claim 1, wherein the second search result request is received in response to a user input.

4. The method of claim 1, wherein the step of outputting data indicative of the first result data structure further comprises outputting an end index value for an index of result data structures, wherein the second search result request comprises the end index value, and wherein the step of outputting data indicative of the second result data structure further comprises comparing the end index value to a current end index value of the index of result data structures.

5. The method of claim 1, further comprising:
ranking, by the one or more processing modules, the first result data structure and the second result data structure based, at least in part, on the scores.

6. The method of claim 1, further comprising:
receiving data indicative of a user selection of the first result data structure or the second result data structure; and generating, using the one or more processing modules, a result query based, at least in part, on the selected first result data structure or second result data structure.

7. The method of claim 6, further comprising:
querying, by the one or more processing modules, the database based on the result query; and
outputting, by the one or more processing modules, result data based on the result query.

8. The method of claim 1, wherein the search query comprises a search term, wherein each database data structure of the plurality of database data structures comprises a metadata term and associated data, wherein the step of querying the database comprises:

determining, by the one or more processing modules, whether the search term matches a portion of the metadata term for the first database data structure, determining, by the one or more processing modules, that the metadata term is associated with a measure when the search term matches a portion of the metadata term, and identifying, by the one or more processing modules, the first database data structure as part of a search set in response to the search term matching a portion of the metadata term and the metadata term is associated with a measure.

9. The method of claim 8, wherein the step of querying the database further comprises:

determining whether the search term of matches a portion of the associated data of the first database data structure of the search set, and identifying the first database data structure as part of a result set when the search term matches a portion of the associated data.

10. The method of claim 9, wherein the first result data structure includes a match identifier when the search term exactly matches the metadata term or a portion of the associated data.

11. A system comprising:

a tangible computer-readable storage device comprising instructions; and one or more data processors coupled to the tangible computer-readable storage device and configured to execute the instructions to perform operations comprising:

parsing a search query into a set of search terms;

querying, in parallel, a database having a plurality of database data structures based on the set of search terms, wherein each database data structure of the plurality of database data structures comprises a metadata term and associated data, wherein a query procedure for the operation of querying the database comprises:

determining whether a search term of the set of search terms matches a portion of the metadata term for each database data structure of the plurality of database data structures, determining that the metadata term is associated with a measure when a search term matches a portion of the metadata term, identifying a database data structure as part of a search set when the metadata term is associated with a measure, determining whether a search term of the set of search terms matches a portion of the associated data for each database data structure of the search set, and identifying a database data structure as part of a result set when a search term of the set of search terms matches a portion of the associated data;

generating a result data structure for each database data structure of the result set, wherein the result data structure includes a properties object including a unique identifier for the result data structure and a score relative to the search query, a metadata object including data indicative of a portion of the database data structure responsive to the search query, and a data object including a total count value indicative of a total number of result data structures generated in response to the querying; and outputting data indicative of each generated result data structure.

12. The system of claim 11, wherein the query procedure for the operation of querying the database further comprises:

determining a number of metadata hits for the set of search terms for each database data structure, and ordering the database data structures in the search set based on the number of metadata hits for each database data structure of the search set.

13. The system of claim 11, wherein the search query is parsed into sets of five or less search terms.

14. The system of claim 11, further comprising;
populating the data object of a generated result data structure in response to a user selection of that generated result data structure based on the associated data of a database data structure associated with the result data structure.

15. The system of claim 14, wherein the operation of populating the data object of a generated result data structure comprises generating a query based, at least in part, on the metadata object of the generated result data structure.

16. A method for providing search results in response to a search query comprising:
generating a result data structure associated with a database data structure in response to a search query, wherein the result data structure comprises a dimension portion wherein the result data structure includes,
   a properties object including a unique identifier for the result data structure and a score relative to the search query,
   a metadata object including data indicative of a portion of the database data structure responsive to the search query, and
   a data object including a total count value indicative of a total number of result data structures;
receiving a count parameter for the dimension portion;
querying a database for data of the database data structure associated with the result data structure, wherein the data is limited by the count parameter; and
outputting the returned data.

17. The method of claim 16, further comprising:
determining whether the dimension portion is associated with a time dimension; and
   setting the count parameter to a predetermined value based on the time dimension.

* * * * *